(12) United States Patent
Tang et al.

(10) Patent No.: US 8,514,555 B2
(45) Date of Patent: Aug. 20, 2013

(54) ELECTRONIC DEVICE

(75) Inventors: Xue-Dong Tang, Shenzhen (CN); Ping Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 186 days.

(21) Appl. No.: 13/214,217

(22) Filed: Aug. 21, 2011

(65) Prior Publication Data

US 2012/0229965 A1 Sep. 13, 2012

(51) Int. Cl.
*G06F 1/16* (2006.01)

(52) U.S. Cl.
USPC ............... 361/679.01; 16/319; 248/278.1; 206/449

(58) Field of Classification Search
USPC ............. 16/223, 364, 303, 342, 319, 275; 220/4.02; 248/121, 286.1, 157, 688, 278.1; 52/302.1; 206/45.25, 45.24, 37, 778, 320, 206/449, 232, 521.1; 361/679.08, 679.54, 361/679.01, 679.28, 679.17, 679.55, 679.41, 361/679.02, 679.27, 679.23, 679.58, 679.06, 361/679.15, 679.22; 312/323, 293.1, 237, 312/319.2, 223.1, 223.2, 334.46; 345/156, 345/168, 169, 1.1, 173, 174
See application file for complete search history.

(56) References Cited

U.S. PATENT DOCUMENTS

| | | | |
|---|---|---|---|
| 2006/0266894 A1* | 11/2006 | Chih | 248/121 |
| 2007/0074473 A1* | 4/2007 | Yamaguchi et al. | 52/302.1 |
| 2008/0061058 A1* | 3/2008 | Wang et al. | 220/4.02 |
| 2009/0260183 A1* | 10/2009 | Chen et al. | 16/223 |

\* cited by examiner

*Primary Examiner* — Hung Duong
(74) *Attorney, Agent, or Firm* — Altis Law Group, Inc.

(57) ABSTRACT

An electronic device includes a main body, a hinge assembly, and a decorative cover. The main body includes a holder and a holder cover. The holder cover defines an opening at a lateral side thereof and a first notch at a middle portion of the lateral side communicating with the opening. An elastic arm extends from an inner wall of the holder cover to the opening. The elastic arm defines a receiving hole. The hinge assembly includes a connecting portion inserted in the opening of the main body, and a pivot extending through the first notch for connecting to a display. The decorative cover covers the hinge assembly. The decorative cover includes a projection engaged into the receiving hole of the elastic arm to fixedly mount the decorative cover on the holder cover.

15 Claims, 5 Drawing Sheets

ELECTRONIC DEVICE

BACKGROUND

1. Technical Field

The present disclosure relates to electronic devices and, more particularly, to an electronic device with a cover for a hinge assembly.

2. Description of Related Art

Many electronic devices have hinge assemblies that if left exposed would ruin the look of the device and expose the assembly to pollutants such as dust. To solve this problem protective covers are employed to cover such assemblies. However, such covers are screwed in place which requires time and the use of a tool to remove the cover which is inconvenient and adds to the cost of the assembly.

Therefore, there is room for improvement in the art.

DETAILED DESCRIPTION

Figure 1:
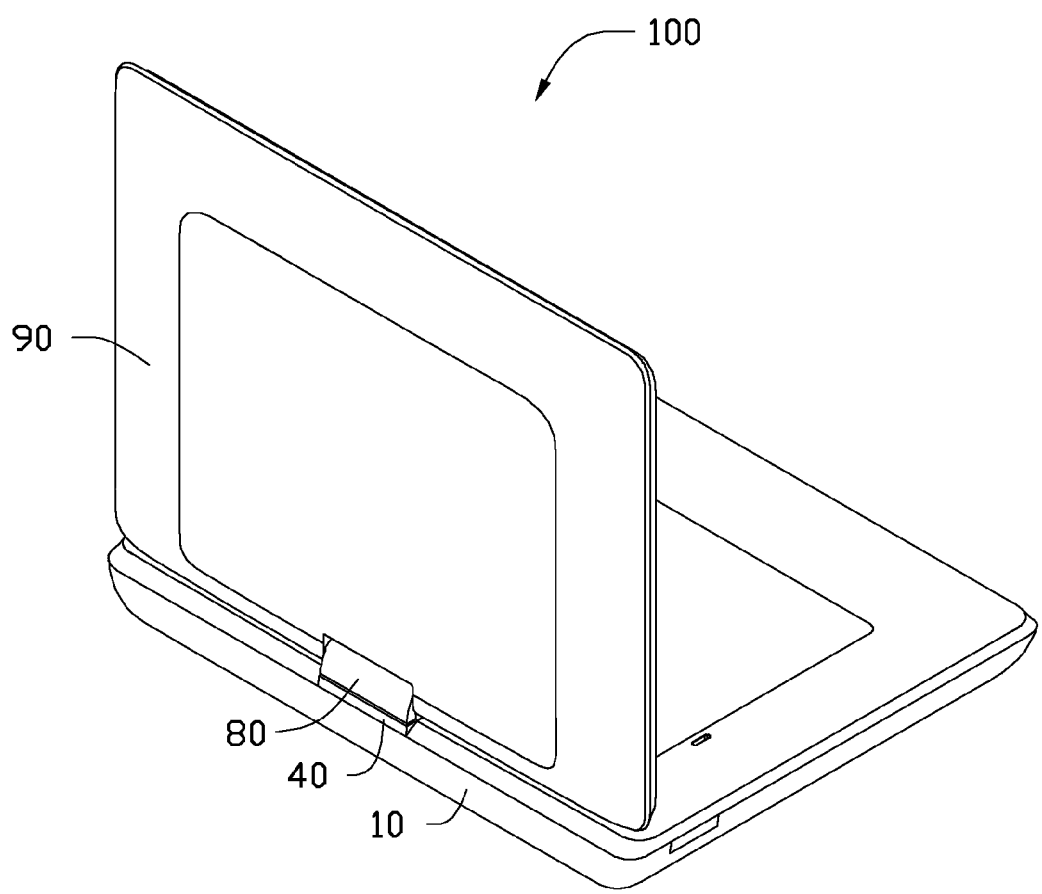
FIG. 1 is a schematic, isometric view of an electronic device with a display thereof opened according to an exemplary embodiment of the present disclosure.

Referring to FIG. 1, an electronic device 100 according to an exemplary embodiment is shown. The electronic device 100 includes a main body 10, a hinge assembly 80, a display 90 pivotably connected to the main body 10, and a decorative cover 40. The electronic device 100 can be a notebook computer, a projector, or an optical disk player, such as digital video disk (DVD) player, a compact disk (CD) player, a video compact disk (VCD) player etc. In the present embodiment, the electronic device 100 is a DVD player.

Figure 2:
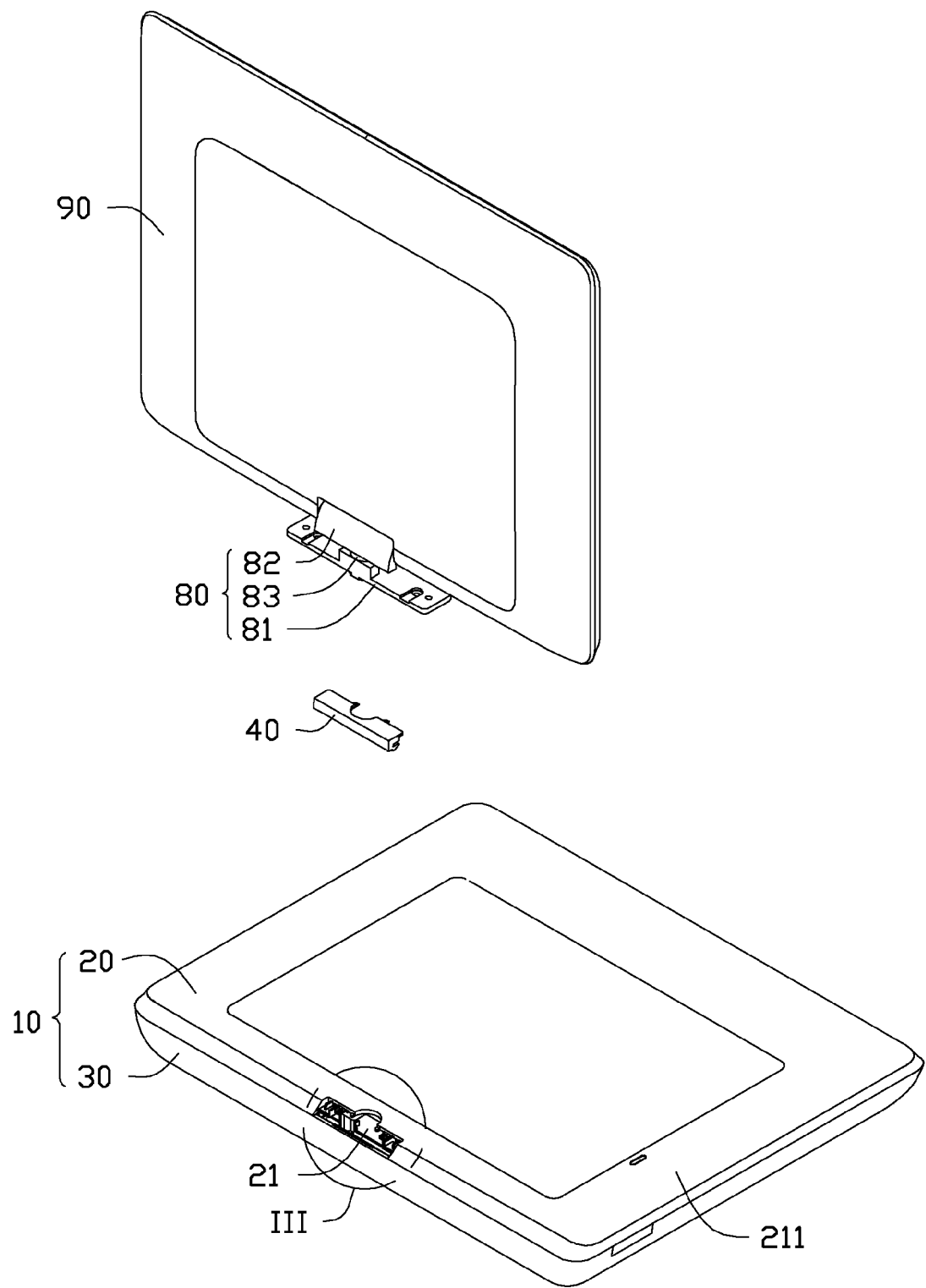
FIG. 2 is a partially exploded, isometric view of the electronic device of FIG. 1.
Figure 3:
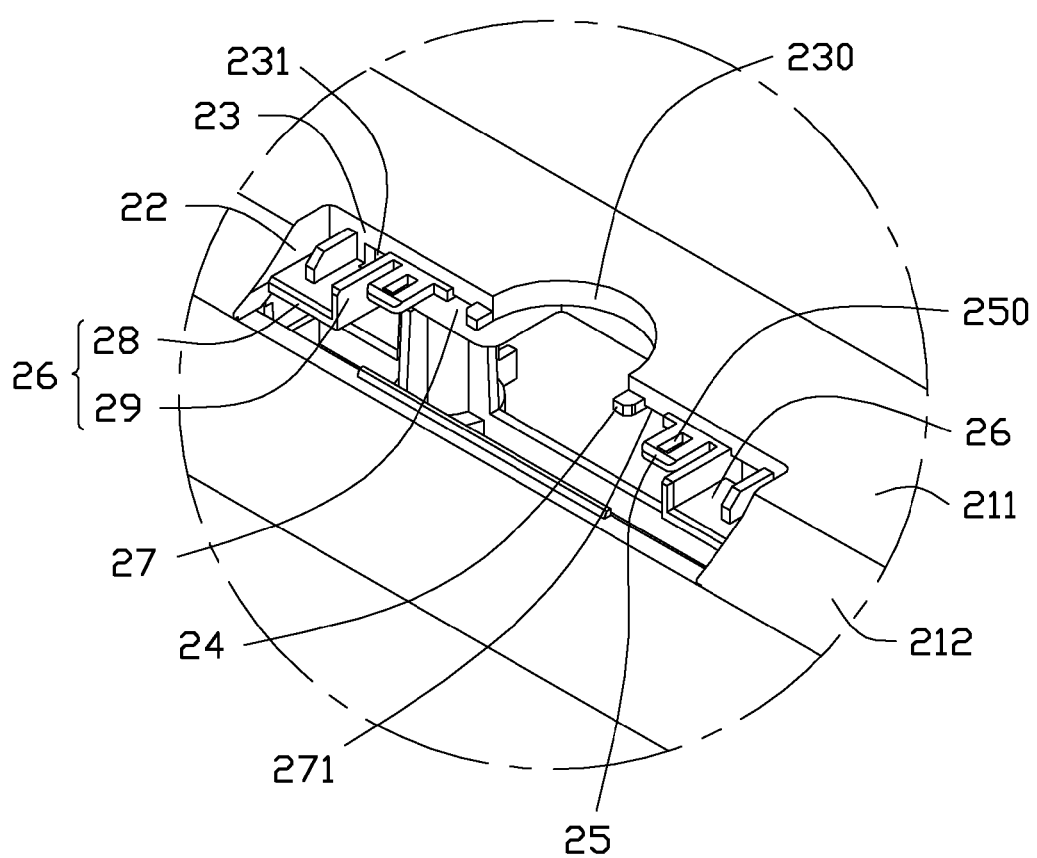
FIG. 3 is an enlarged view of a circled portion III of FIG. 2.

Referring to FIGS. 2 to 3, the main body 10 includes a holder 30 and a holder cover 20 engaged with the holder 30, which together define a chamber (not labeled). The chamber is configured for receiving an optical disk and electronic elements.

The holder cover 20 has an upper surface 211 and a side surface 212 adjacent to the upper surface 211. An opening 21 is defined in an area where the upper surface 211 joins the side surface 212 to house engaging elements of the hinge assembly described below. The holder cover 20 has two sidewalls 22 and an inner wall 23 arranged between and perpendicularly to the sidewalls 22 in the opening 21. The holder cover 20 defines a semi-circular first notch 230 at a middle of an edge of the upper surface 211 bounding the opening 21. The first notch 230 communicates with the opening 21. The holder cover 20 includes two sets of first engaging portions. Each set of engaging portions includes a cam 24, an elastic arm 25, and a limiting portion 26. The two sets of first engaging portions are formed on the inner wall 23 and respectively located at two sides of the first notch 230. The cams 24 are adjacent to the first notch 230 and symmetrical about the first notch 230. The limiting portions 26 are adjacent to the sidewalls 22 and away from the first notch 230 and symmetrical about the first notch 230. The elastic arms 25 are respectively arranged between the cams 24 and the limiting portions 26, and symmetrical about the first notch 230.

Each of the elastic arms 25 defines a rectangular receiving hole 250 at a center thereof. A guiding area 27 is formed between the cam 24 and the corresponding elastic arm 25. Each of the limiting portions 26 includes a first portion 28 horizontally extending from the inner wall 23, and a second portion 29 connected to the first portion 28 and perpendicularly extending from the inner wall 23. In the present embodiment, top surfaces of the cams 24, the elastic arms 25, and the second portions 29 are all coplanar with each other. In the present embodiment, the inner wall 23 defines a rectangular through hole 231 adjacent to a top surface of each first portion 28, and the inner wall 23 defines a guiding hole 271 adjacent to a top surface of each guiding area 27.

Referring to FIG. 2 again, the hinge assembly 80 includes a base 81, a pivot 82, and a connecting portion 83 connecting the base 81 to the pivot 82. The pivot 82 is pivotably connected to the display 90, thus the display 90 can be rotated around the pivot 82 to open and closed positions.

Figure 4:
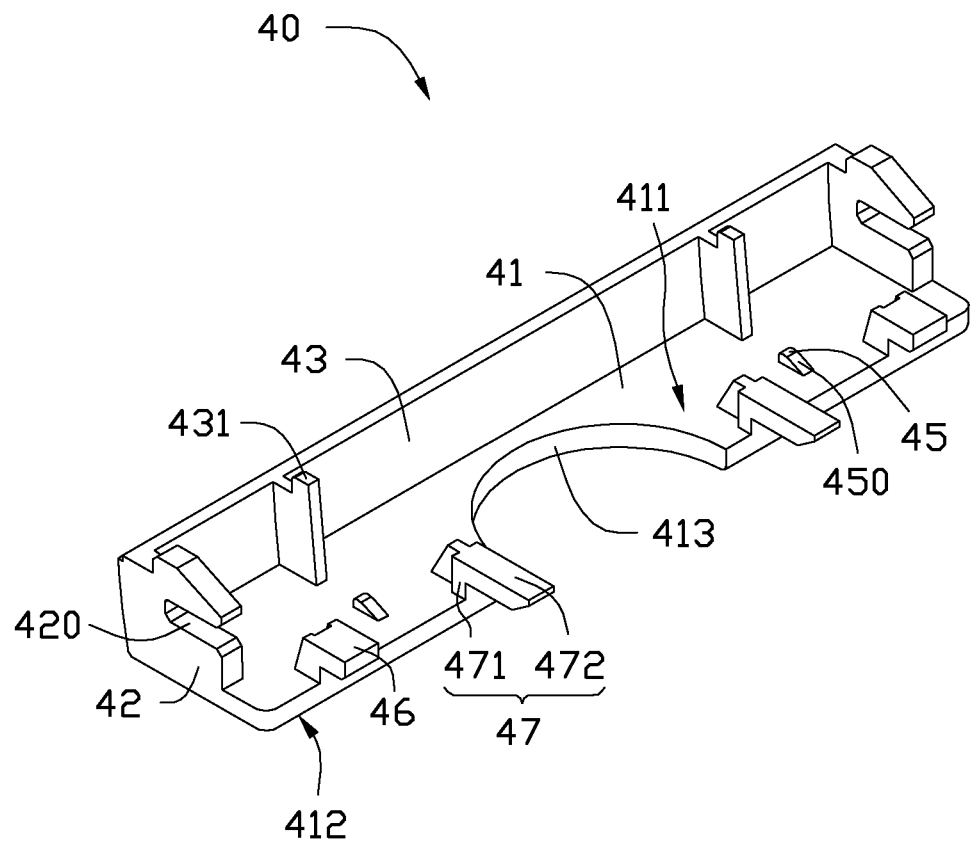
FIG. 4 is an enlarged view of a decorative cover of the electronic device of FIG. 2, but shown from another viewpoint.
Figure 5:
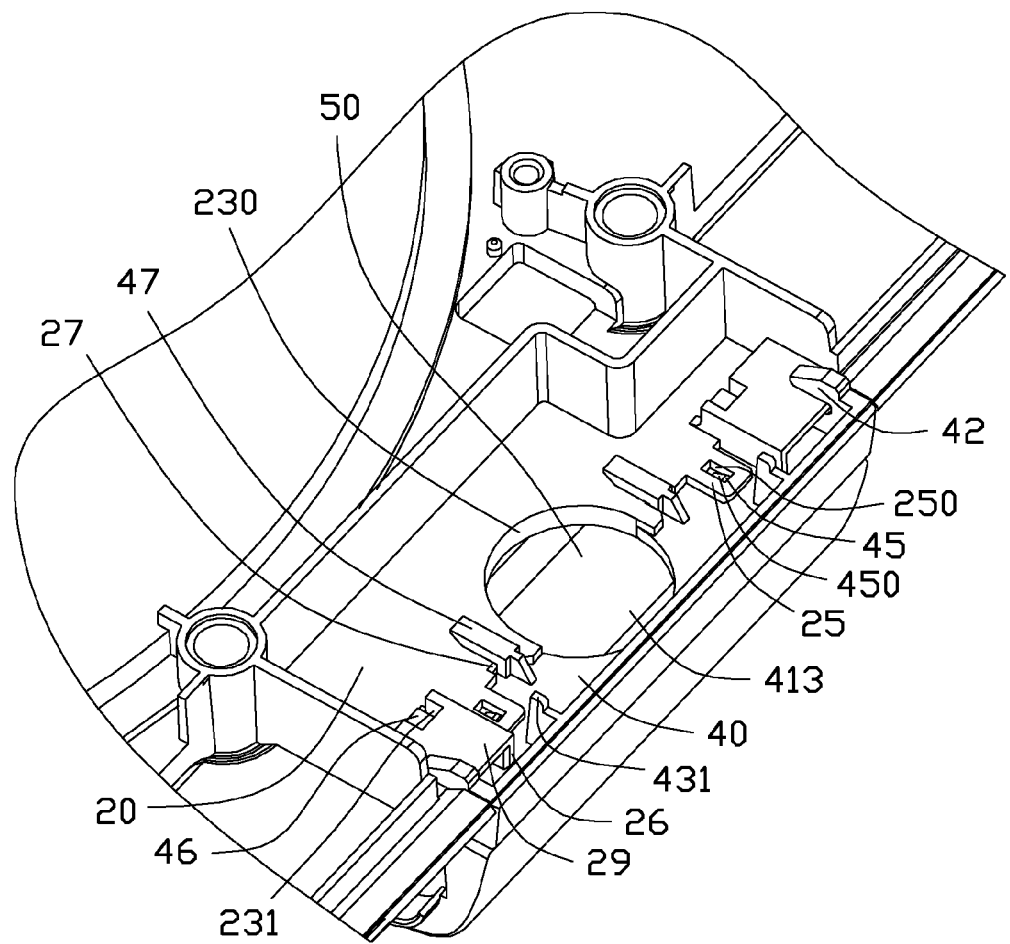
FIG. 5 is a bottom partial view of the electronic device showing the decorative cover engaged with a cover.

Referring to FIGS. 4 to 5, the decorative cover 40 covers the opening 21 and includes a top plate 41, a rear plate 43 perpendicularly extending from a lateral side of the top plate 41, and two side plates 42 perpendicularly and respectively extending from two ends of the top plate 41. The side plates 42 are connected to the rear plate 43. The top plate 41 includes a first surface 411 facing to the rear plate 43, and a second surface 412 opposite to the first surface 411. The top plate 41 defines a semi-circular second notch 413 at a middle portion thereof. The second notch 413 penetrates through the first surface 411 and the second surface 412. The second notch 413 and the first notch 230 cooperatively define a through hole 50 for receiving the connecting portion 83 when the decorative cover 40 is assembled to the cover.

The decorative cover 40 includes two sets of second engaging portions. Each set of engaging portions includes a locking portion 47, a projection 45 and an inset portion 46. The two sets of first engaging portions are formed on the first surface 411 and respectively located at two sides of the second notch 413. The locking portions 47 are adjacent to the second notch 413 and symmetrical about the second notch 413. The locking portions 47 are respectively corresponding to the guiding areas 27. Each of the locking portions 47 includes an engaging part 471 extending perpendicularly from a lateral side of the first surface 411, and a guiding part 472 perpendicularly extending from a distal end the engaging part 471. A free end of the guiding part 472 extends beyond the first surface 411. The inset portions 46 are adjacent to the side plates 42 and away from the second notch 413 and symmetrical about the second notch 413. The inset portions 46 are respectively corresponding to the through holes 231. A free end of each of the inset portions 46 extends beyond the first surface 411. The wedge-shape projections 45 are respectively arranged between the inset portions 46 and the locking portions 47. Each of the projections 45 is wedge-shaped, includes a slanted surface 450, and corresponds to the receiving hole 250.

Each of the side plates 42 defines a slot 420 away from the rear plate 43 for engaging a corresponding one of the first portions 28. The slots 420 are approximately parallel to the top plate 41. Two baffle plates 431 extend from the first surface 411 and connect to the rear plate 43 for reinforcing the decorative cover 40. In the present embodiment, the two baffle plates 431 are respectively adjacent to the side plates 42 and symmetrical about the second notch 413.

In assembly of the electronic device 100, the base 81 is inserted into the opening 21 until the connecting portion 83 engages in the first notch 230. The decorative cover 40 is positioned to cover the opening 21 and the top plate 41 contacts the inner wall 23. The engaging parts 471 abut the inner wall 23, and the guiding parts 472 extend along the corresponding guiding area 27 with the free end thereof extending beyond the top plate 41 engaging in the corresponding guiding hole 271. The inset portions 46 engage in the through holes 231, respectively. The projections 45 slide into the corresponding receiving hole 250 under the guidance of the slanted surfaces 450. The first portions 28 engage in the slots 420. Thereby, the decorative cover 40 is engaged with the holder cover 20, and the second surface 412 and the upper surface 211 are coplanar. The first notch 230 and the second notch 413 cooperatively define a circular through hole 50, through which the pivot 82 extends to pivotably connect to the display 90.

The projection 45 can slide into or out from the receiving hole 250 to make the decorative cover 40 engage with or separate from the holder cover 20; therefore, the decorative cover 40 can be easily assembled to and disassembled from the holder cover 20.

It is to be further understood that even though numerous characteristics and advantages have been set forth in the foregoing description of embodiments, together with details of the structures and functions of the embodiments, the disclosure is illustrative only; and that changes may be made in detail, especially in matters of shape, size, and arrangement of parts within the principles of the disclosure to the full extent indicated by the broad general meaning of the terms in which the appended claims are expressed.

What is claimed is:

1. An electronic device, comprising:
   a main body comprising a holder and a holder cover, the holder cover defining an opening at a lateral side thereof and a first notch at a middle portion of the lateral side communicating with the opening, an elastic arm extending from an inner wall of the holder cover to the opening, the elastic arm defining a receiving hole;
   a hinge assembly comprising a connecting portion inserted in the opening of the main body, and a pivot extending through the first notch for connecting to a display; and
   a decorative cover covering the hinge assembly, the decorative cover comprising a projection engaged into the receiving hole of the elastic arm to fixedly mount the decorative cover on the holder cover.

2. The electronic device of claim 1, wherein the decorative cover comprises a top plate and a rear plate perpendicularly extending from a lateral side of the top plate, the top plate having a first surface facing the rear plate, the projections extending from the first surface of the top plate.

3. The electronic device of claim 2, wherein the top plate defines a second notch at a central portion of a lateral side thereof.

4. The electronic device of claim 3, wherein the first notch and the second notch are semi-circular in shape, the first notch cooperating with the second notch to define a through hole.

5. The electronic device of claim 1, wherein two elastic arms are symmetrical about the first notch.

6. The electronic device of claim 1, wherein the holder cover further comprises two cams arranged on the inner wall and adjacent to the notch, the two cams being symmetrical about the first notch.

7. The electronic device of claim 6, wherein each of the cams and each of the corresponding elastic arms cooperatively define a guiding area.

8. The electronic device of claim 7, wherein the decorative cover further comprises two locking portions, each of the locking portions corresponding to one of the guiding areas.

9. The electronic device of claim 8, wherein the inner wall of the holder cover defines a guiding hole adjacent to a top surface of each guiding area, each of the locking portions corresponding to one of the guiding hole.

10. The electronic device of claim 1, wherein the holder cover further comprises two limiting portions adjacent to the elastic arms and away from the first notch.

11. The electronic device of claim 10, wherein two limiting portions are symmetrical about the first notch, each of the limiting portions comprising a first portion horizontally extending from the inner wall and a second portion connected to the first portion and perpendicularly extending from the inner wall.

12. The electronic device of claim 11, wherein the inner wall defines two through holes, each of the through holes adjacent to a top surface of the first portion.

13. The electronic device of claim 12, wherein the decorative cover further comprises two inset portion respectively corresponding to the through holes.

14. The electronic device of claim 10, wherein the decorative cover comprises a top plate, a rear plate perpendicularly extending from a lateral side of the top plate and two side plates perpendicularly extending from two ends of the top plate, the projections extending from the top plate, each of the side plate defining a slot away from the rear plate for engaging the first portion.

15. An electronic device, comprising:
   a main body defining an opening at a lateral side thereof and a first notch communicating with the opening, at least one elastic arm extending from the main body into the opening, the at least one elastic arm defining a receiving hole;
   a hinge assembly comprising a connecting portion received in the opening of the main body, and a pivot for connecting to a display; and
   a decorative cover covering the connecting portion of the hinge assembly, the decorative cover comprising at least one projection insetting into the receiving hole of the at least one elastic arm to make the decorative cover engage with the holder cover, and defining a second notch, the second notch cooperating with the first notch to define a through hole, the pivot extending through the through hole.

* * * * *